United States Patent [19]

Meuche

[11] Patent Number: 5,454,939

[45] Date of Patent: Oct. 3, 1995

[54] WASTEWATER EVAPORATOR WITH ROTATABLE DRUM

[75] Inventor: Howard O. Meuche, Fort Branch, Ind.

[73] Assignee: Monitrol, Inc., Vincennes, Ind.

[21] Appl. No.: 182,648

[22] Filed: Jan. 18, 1994

[51] Int. Cl.⁶ .................................................. B01D 17/12
[52] U.S. Cl. ............................ 210/134; 34/110; 34/573; 210/179; 210/180; 210/258; 159/43.1; 159/44
[58] Field of Search .................... 34/573, 110, 112, 34/113; 210/86, 97, 141, 143, 179, 180, 197, 768, 769, 770, 774, 784, 402, 257.1, 258, 259, 513, 248, 134; 159/43.1, 44

[56] References Cited

U.S. PATENT DOCUMENTS

| | | | |
|---|---|---|---|
| 340,290 | 4/1886 | Corscaden | 210/180 |
| 2,045,115 | 6/1936 | Allen et al. | 34/112 |
| 2,250,773 | 7/1941 | Overton | 34/112 |
| 2,954,613 | 10/1960 | Baker | 34/112 |
| 3,351,119 | 11/1967 | Rosenblad | 159/43.1 |
| 4,067,119 | 1/1978 | Overton | 34/110 |
| 5,082,525 | 1/1992 | Travis | 159/16.1 |
| 5,325,605 | 7/1994 | Carew | 34/573 |
| 5,336,398 | 8/1994 | Russell et al. | 210/257.1 |

FOREIGN PATENT DOCUMENTS 3734 of 1872 United Kingdom ...................... 34/112

OTHER PUBLICATIONS

Samsco Wastewater Evaporator Brochure, undated.
Emtec Wastewater Reducer Brochure, undated.

*Primary Examiner*—Joseph W. Drodge
*Attorney, Agent, or Firm*—Bose McKinney & Evans

[57] ABSTRACT

A wastewater treatment device evaporates water from contaminant containing wastewater, to produce a contaminant concentrated residue. The device includes a transport, such as pump, for transporting wastewater to a wastewater applicator, and a wastewater applicator for applying the wastewater to an evaporating surface of an evaporator drum. A rotatable evaporator drum has a heat conductive evaporating surface, and a heater for heating the evaporating surface to foster the evaporation of water from the wastewater. A motor, chain and drive shaft are provided for rotating the evaporator drum, and a scraper is provided for removing the contaminant concentrated residue from the evaporating surface. A controller is provided for controlling the operation of the device.

25 Claims, 5 Drawing Sheets

WASTEWATER EVAPORATOR WITH ROTATABLE DRUM

TECHNICAL FIELD OF THE INVENTION

The present invention relates to a device for treating wastewater, and more particularly to a device for treating wastewater that contains small amounts of nonvolatile compounds (e.g., metals, salts, oils, etc.), to remove the water from the wastewater, and thereby leaving only a reduced volume of a contaminant as a concentrated dry residue.

BACKGROUND OF THE INVENTION

Many industrial processes generate wastewater streams that contain small mounts of environmentally hazardous contaminants. Examples of such industrial processes include electroplating, circuit board manufacturing, photographic processing, and metal finishing. The wastewater generated from such processes must be treated as hazardous waste.

From an environmental standpoint, the hazard arises not from the water itself, but from the materials contained within the water. Examples of such materials include metals, such as copper, silver, nickel and lead; salts of these metals; and oils. Even though the water itself is not an environmental hazard, it adds to the problem the plant operator faces in disposing of the wastewater. Typically, waste removal fees are based on both the environmental hazard posed by the product, and of the volume of product. The difficulty in dealing with wastewater products is that the water, while not hazardous, creates a large volume of material that must be disposed of. Because of the bulk and the liquidity of the water, the cost of removing, landfilling or treating the wastewater produced by the industrial operation is quite expensive.

Therefore, the removal of the water component from the wastewater stream, while retaining the hazardous material residue could likely result in substantial savings to the waste generator. With the water removed, the contaminant residue is sufficiently small so as to be relatively inexpensive to dispose of, even in a special or hazardous material landfill.

To this end, several methods have been devised for separating the water component of a wastewater stream from the hazardous material residue component. Many plants, especially those producing large volumes of contaminated wastewater, have on-site treatment facilities that separate the contaminant residue portion of the wastewater. Unfortunately, although in-plant facilities work well in large scale operations that produce large mounts of wastewater, they are often not cost effective when used in operations that generate only relatively small amounts of wastewater (e.g. from 500 gallons per week to several thousands gallons per week). Smaller generators generally cannot justify the cost of building their own treatment facility, and also do not want the problems that accompany a treatment facility. For example, one of these problems is that an in-house treatment plant must be operated by a certified operator. Additionally, the typical cost for setting up an in-house treatment facility is 20,000 to 25,000, and is often much more expensive.

Therefore, it is one object of the present invention to provide a means for treating wastewater to remove the water component of the wastewater, that is adaptable, and affordable for use by generators of relatively small amounts of wastewater.

SUMMARY OF THE INVENTION

In accordance with the present invention, a device is provided for evaporating wastewater containing contaminants, to produce a concentrated dry residue. The device comprises a transport means for transporting wastewater to a wastewater applicator means. A wastewater applicator means is provided for applying water to an evaporating surface of an evaporator drum. A rotatable evaporator drum means has a heat conductive evaporating surface. A heater means is provided for heating the evaporating surface to foster the evaporation of water from the wastewater. A drive means is provided for rotating the drum means, and a residue removal means is provided for removing the contaminant concentrated residue from the evaporating surface. A control means is provided for controlling the operation of the device.

In a preferred embodiment of the present invention, a reservoir means is provided for receiving wastewater, prior to the wastewater being transported to the waste applicator means. The reservoir means includes a liquid level sensing means for sensing the level of water in the reservoir means. The control means includes a first switch operatively coupled between the liquid level sensing means and the pump, for turning the pump means on and off in response to the level of liquid in the reservoir, to maintain the wastewater in the reservoir means at a first predetermined level. The liquid level sensing means is also coupled to a second switch for turning off the device in response to the level of the liquid in the reservoir means dropping below a second predetermined level.

Additionally, the evaporator drum comprises a generally cylindrical drum that is composed of a heat conductive material. The radially outer surface of the drum comprises the heat conductive evaporating surface. The drum is driven by a motor and a shaft means. The shaft means is engageable with the radially inner surface of the drum for both supporting and driving the drum means.

One feature of the present invention is that the device includes control means and liquid level sensing means, which can control the flow of wastewater into the device, and can control the operation of the device to shut it down when it runs out of wastewater feed stock. These features have the advantage of making the device capable of operating without being attended by a human operator. The intake of the device can be coupled to a source of wastewater to be treated, such as a barrel of wastewater. The device will continue to draw wastewater from the barrel, and treat the wastewater, until the wastewater in the barrel is depleted. Through the first switch and control means, the intake of water into the device is controlled to maintain the correct amount of water in the device, and avoid underfill and overfill situations. The device also includes a second control switch that shuts the machine down if the level of water falls below a predetermined level.

Through these various control means, the device can be operated with only a minimal amount of labor input. The only real labor required to operate the device consists of moving new sources of wastewater into place for treatment by the device. A second advantage is that the automatic shut-off feature of the device permits it to be used on a "round the clock" basis, or at least at times when no one is working in the plant. At the end of the work day, the device can be attached to a new source of wastewater, which will be treated during the evening, until the wastewater feed stock is depleted. When the wastewater feed stock is depleted, the device will shut itself down, without the need of any further intervention.

Another feature of the present invention is that the device includes a rotating drum evaporative surface. The rotating drum evaporative surface has the advantage of providing a shape having a large amount of surface area in a compact volume. Additionally, the drum speed can be adjustable to permit the user to achieve maximum evaporation and collection of solid materials.

These and other features of the present invention will become apparent to those skilled in the art upon a review of the description presented below, representing the best mode known to applicant of practicing the invention.

DETAILED DESCRIPTION OF THE INVENTION

Figure 1:
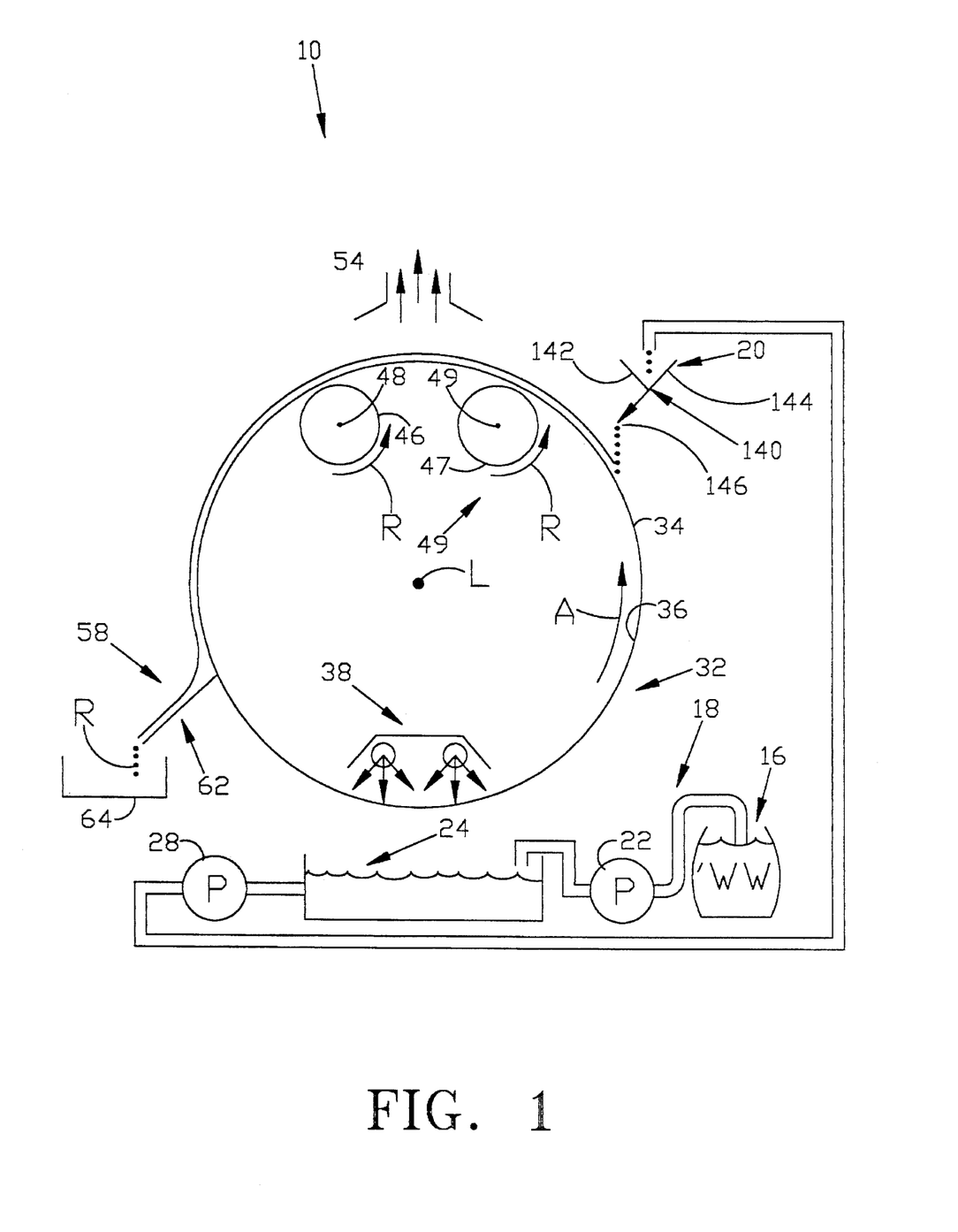
FIG. 1 is a schematic view of the wastewater evaporator of the present invention.

A schematic representation of the wastewater evaporator device 10 of the present of invention is shown in FIG. 1. The device 10 is provided for evaporating water from a contaminant containing wastewater feed stock WW to produce a contaminant concentrated residue R.

The device 10 draws wastewater WW from a wastewater feed stock source, such as a storage tank or a barrel 16. A transport means 18 is provided for transporting the wastewater to a wastewater applicator means 20 contained on the device 10. The transport means 18 includes a first pump 22 for drawing wastewater WW from the barrel 16, and pumping the wastewater WW to a reservoir means 24. A second pump 28 is provided for drawing water from the reservoir 24, and pumping the wastewater to the wastewater applicator 20. The wastewater applicator 20 applies water to an evaporating surface of a heat conductive rotatable evaporator drum 32. The rotatable evaporator drum 32 is preferably cylindrical in configuration, and is made from a heat conductive material, such as steel. The drum 32 contains a longitudinal axis L about which the drum 32 rotates in a direction indicated generally by arrow A. Although the drum 32 rotates about axis L, there is no physical axle or other connecting point at the longitudinal axis L. Rather, the longitudinal axis L represents nothing more than a line in space that defines the center of the cylinder that comprises the rotatable drum 32. The radially outer surface 34 of the drum 32 comprises the evaporating surface 34 upon which the wastewater WW is applied.

A heater means 38, such as a plurality of radiant heaters is provided for heating the radially inner surface of the evaporator drum 32. Because of the heat conductive nature of the drum 32, the heat applied by the heater means 38 also heats the radially outer evaporating surface 34 of the drum 32, to evaporate water from the wastewater WW that is applied thereto.

A drive means 44 is provided for both supporting the rotatable drum 32, and for rotating the rotatable drum in a direction indicated by arrow A. The drive means 34 includes a plurality of disks 46 having radially outer surfaces that contact the radially inner surface 36 of the rotatable drum 32. The disks 46, 47 are journaled upon first and second drive shafts 48, 49 that are rotated in a direction indicated generally by arrows R. The rotation of the drive shafts 48, 49 rotates the disks 46, 47. The intimate contact between the radially outer surfaces of the disks 46, 47 and the radially inner surface 36 of the drum 32 causes the drum to rotate in a direction indicated generally by arrow A.

An exhaust means 54 is provided for exhausting evaporated water from the device 10. The exhaust means 54 includes a condensing means for fostering the condensation of wastewater, and an exhaust fan for drawing the evaporated water from the device 10.

A residue removal means 58 is provided for removing residue from the exterior evaporating surface 34 of the drum 32. The residue removal means includes two primary components, a scraper blade 62 and a residue holding container 64. The scraper blade 62 exerts tension against the exterior surface 34 of the drum 32 to scrape contaminant containing residue R off the drum. The residue is then transferred to the residue holding container 64, where it is stored until such time as it is disposed of.

The principal of operation of the device is quite elegant. Wastewater that contains contaminants, such as metals, salts and the like, is dripped on the heat conductive surface 34 of the drum 32, which is heated by the radiant heaters 38, to a temperature preferably above of the boiling point of water. For example, the temperature of the drum 32 is preferably kept at about 250° F. During the time that the wastewater is in residence on the surface 32 of the drum, the water component of the wastewater will evaporate off of the surface 34, and be pulled by the exhaust fan 54 from the device, and removed from the device 10. However, as the contaminants are generally not volatile compounds, they will remain on the evaporating surface 34 of the drum 32. As contaminants accumulate, they will build up a residue on the surface of the drum 34. This residue R is then scraped off by the scraper 62. The remaining residue R comprises a substantially smaller volume of waste than the original large volume of wastewater WW. For example, a 50 gallon barrel of wastewater may only yield a few cubic inches of contaminant containing residue.

In addition to the evaporation of water, many of the contaminant containing residues are deposited on the surface of the drum due to the differences in the electromotive potential between the deposited materials, and the iron or steel of the drum. Metallic contaminants, such as copper, nickel and the like, are reduced to metallic form largely due to these differences and also are deposited on the surface 36 of the rotatable evaporator drum 32.

The actual components that comprise the device 10 are best shown in FIGS. 2–6. The device 10 includes a frame 66 to which the components are attached or mounted. The frame 66 can be constructed primarily of either tube steel, or angle iron type components, and includes a plurality of upstanding frame members 68, laterally extending frame members 70, and cross frame members 72. Casters 74 are coupled to the lower ends of four of the corner upstanding frame members 68, to facilitate movement of the device 10. A top panel member 76 extends across the top of the frame 66.

Figure 2:
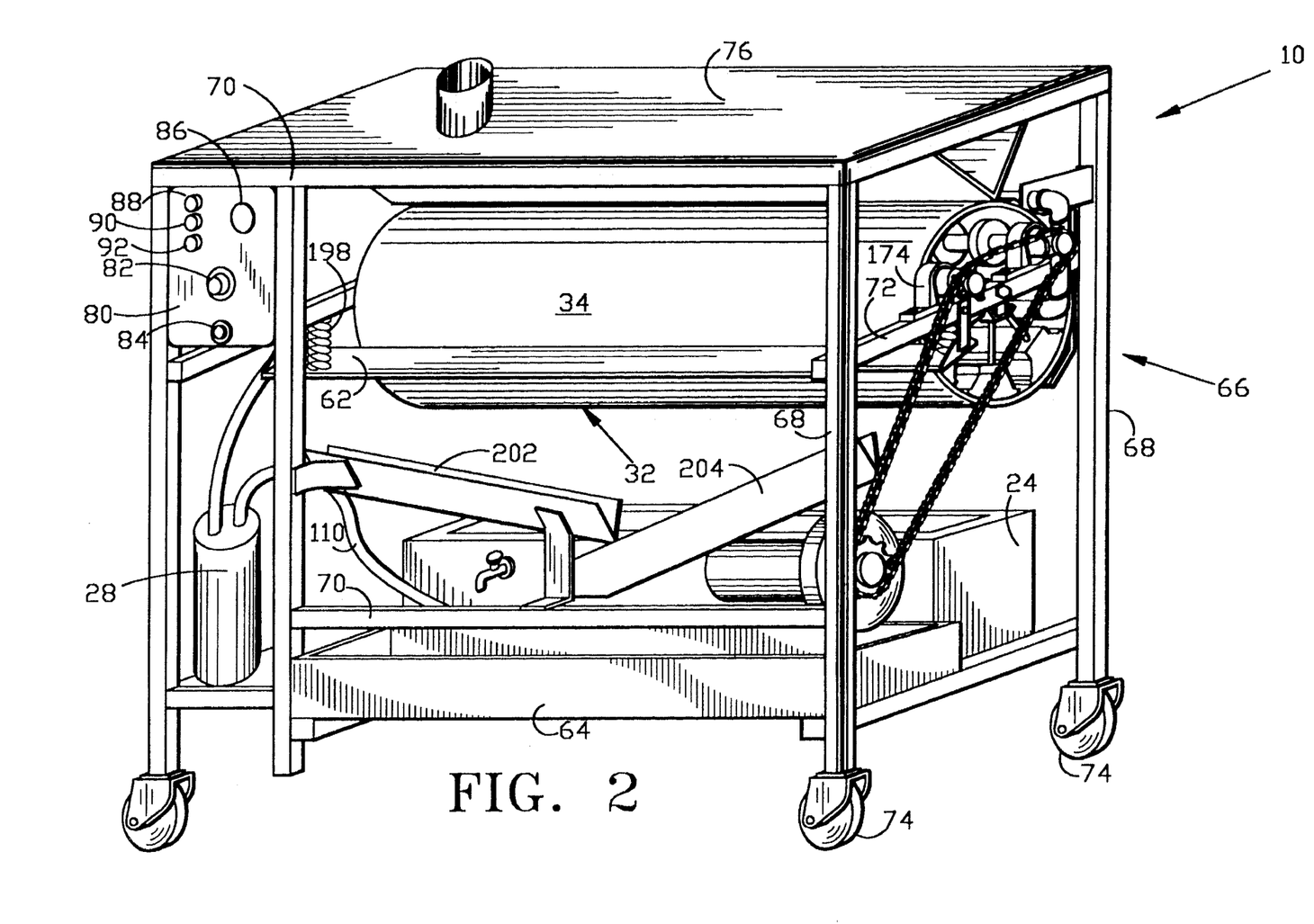
FIG. 2 is a perspective view of the front and right sides of the device of the present invention.

A control panel 80 is placed on the front of the device 10 for enabling the user to control the operation of the device 10. The control panel includes a start button 82 that is used to start the operation of the device from a "cold start," and a reset button 84 for starting the operation of the device 10 after a short interruption. An example of such a short interruption is when the device 10 is shut down temporarily during the time that the user is moving the intake tube from an empty barrel 16 of wastewater, to a full barrel of wastewater. A drum speed adjustment knob 86 is provided for enabling the user to adjust the rotational speed of the drum 32.

The control panel 80 also includes three operating lights, including an "overfill" light 88, a "normal" light 90 and a "tank empty" light 92. Overfill light 88 will turn on if the reservoir tank 24 is in an overfill position. During the operation of the device 10, the normal light 90 will normally be turned on. If the reservoir 24 is empty, the tank empty light 92 will be activated to light.

Figure 3:
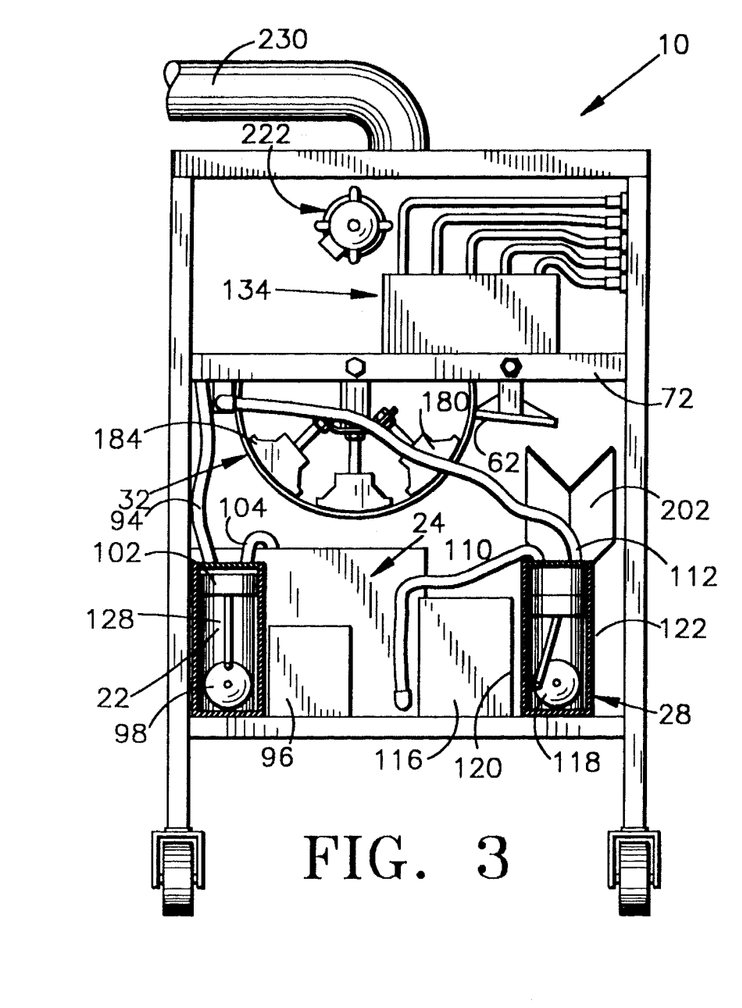
FIG. 3 is a left-side elevational view of the present invention.
Figure 4:
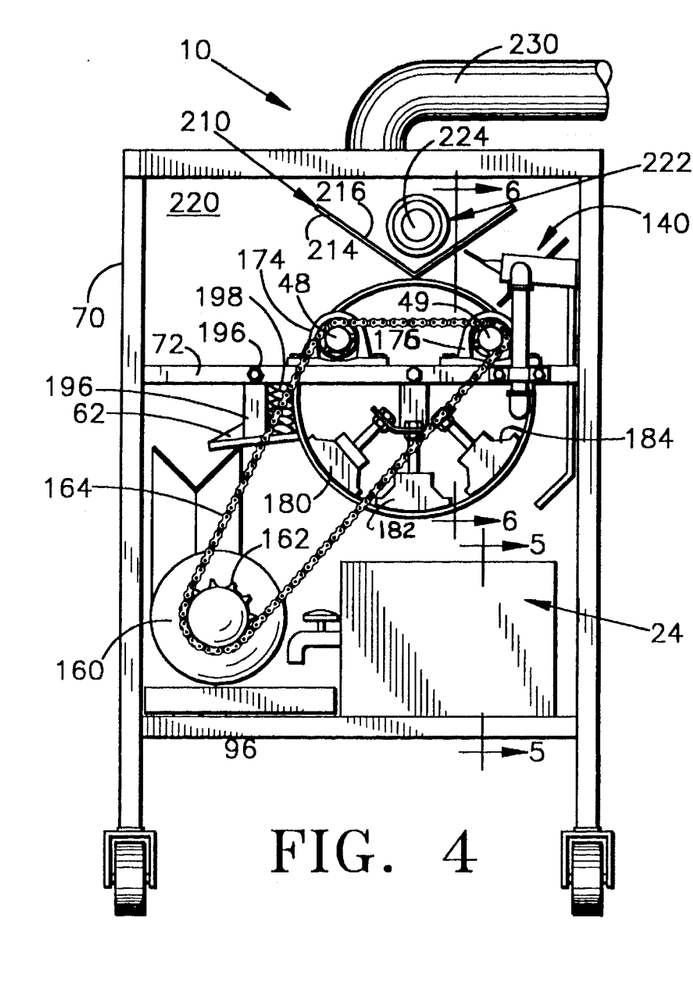
FIG. 4 is a right-side elevational view of the present invention.

The transport means for transporting the wastewater WW from the source (e.g. barrel 16) to the wastewater applicator means 20 is best shown in FIGS. 2–4.

An intake tube 94 extends between the wastewater feed stock source (e.g. barrel 16), and the intake side of the first pump 22. The first pump 22 includes an electric motor 96 that drives an eccentric 98. A rod 100 and piston 102 arrangement is coupled to the eccentric 98. The rotation of the eccentric 98 causes linear, reciprocating movement of the rod 100 and the piston 102. The movement of piston 102 draws water through intake to 94 into the pump 22, and pumps water out of the first pump 22 through output hose 104. Although first pump 22 is preferably a bellows type pump, it will be appreciated that other types of pumps will function in place of the bellows pump of the present invention. The primary desired attribute of the pump 22 is reliability. Pump 22 need not be a high volume pump. Rather, a pump having a pumping capacity of one to two gallons per minute will generally suffice in the preferred embodiment of the device 10 of the present invention.

The output hose 104 from the pump 22 pumps the wastewater WW into a wastewater reservoir 24. Wastewater reservoir 24 comprises a plastic tank, having an open top. The reservoir 24 is disposed directly underneath the drum 32. Preferably, the reservoir 24 is made from a plastic material such as polyvinylchloride that is impervious to corrosive materials such as hydrochloric acid and sulfuric acid. In this regard, polyvinylchloride is less susceptible than even stainless steel to attack from corrosives.

In a preferred embodiment of the device 10, the reservoir 24 is approximately 30" in length, by 9" in width, and approximately 10" in depth. The reservoir 24 serves not only to receive wastewater pumped from the first pump 22, but also serves to catch any wastewater that may drip off of the evaporating surface 34 of the drum 32. To aid in catching such drips, a deflecting shield 108 is placed behind the drum 32, and extends along its entire length. The deflecting shield 108 helps to channel water into the reservoir 24.

The placement of the reservoir tank 24 underneath the drum 32, to catch drips from the drum surface 34 imparts several advantages to the device 10. First, it helps to increase thermal efficiency. The water that drips off of the drum 32 is usually hotter than the water that flows into the reservoir 24 from the barrel 32. The heated drip water off of the drum 32 therefore helps to preheat the water in the reservoir tank 24, thereby facilitating evaporation of the water when it is delivered to the drum 32. Second, the captured drips help to increase efficiency by increasing the level of concentration of contaminants in the water in the tank 24. This occurs because the drips that fall off the drum 32 are "partially evaporated," and the loss of water through the evaporation causes the contaminants to become more concentrated.

The second pump 28 includes an intake tube 110 which draws water from the bottom of the reservoir 24, and to the intake portion of the second pump 28. Second pump 28 also includes an outflow tube 112 which conveys the wastewater pumped by the second pump 28 to the wastewater applicator means 20. Second pump 28 is generally similar to the first pump 22, and includes an electric motor 116 for rotating an eccentric 118. A rod 120 and piston 122 arrangement are coupled to the eccentric 118, so that the rotary movement of the eccentric 118 causes reciprocating movement of the piston 122. Preferably, the rod 120 is adjustably positionable on the eccentric 118 to permit the user to adjust the volume of material pumped by pump 28. By positioning the connecting pin that connects the rod 120 to the eccentric 118 in a position relatively radially closer to the axis of the eccentric 118, the stroke of the piston 122 is shortened, thereby reducing the volume pumped by the pump 28. Conversely, by moving the connecting pin radially outwardly away from the axis of the eccentric 118, the stroke of the piston 122 is lengthened, thus increasing the volume of fluid pumped by the pump 28. By adjusting the relative radial position of the rod 120 on the eccentric 118, the user can adjust the volume of the flow of material pumped by the pump 28.

Figure 5:
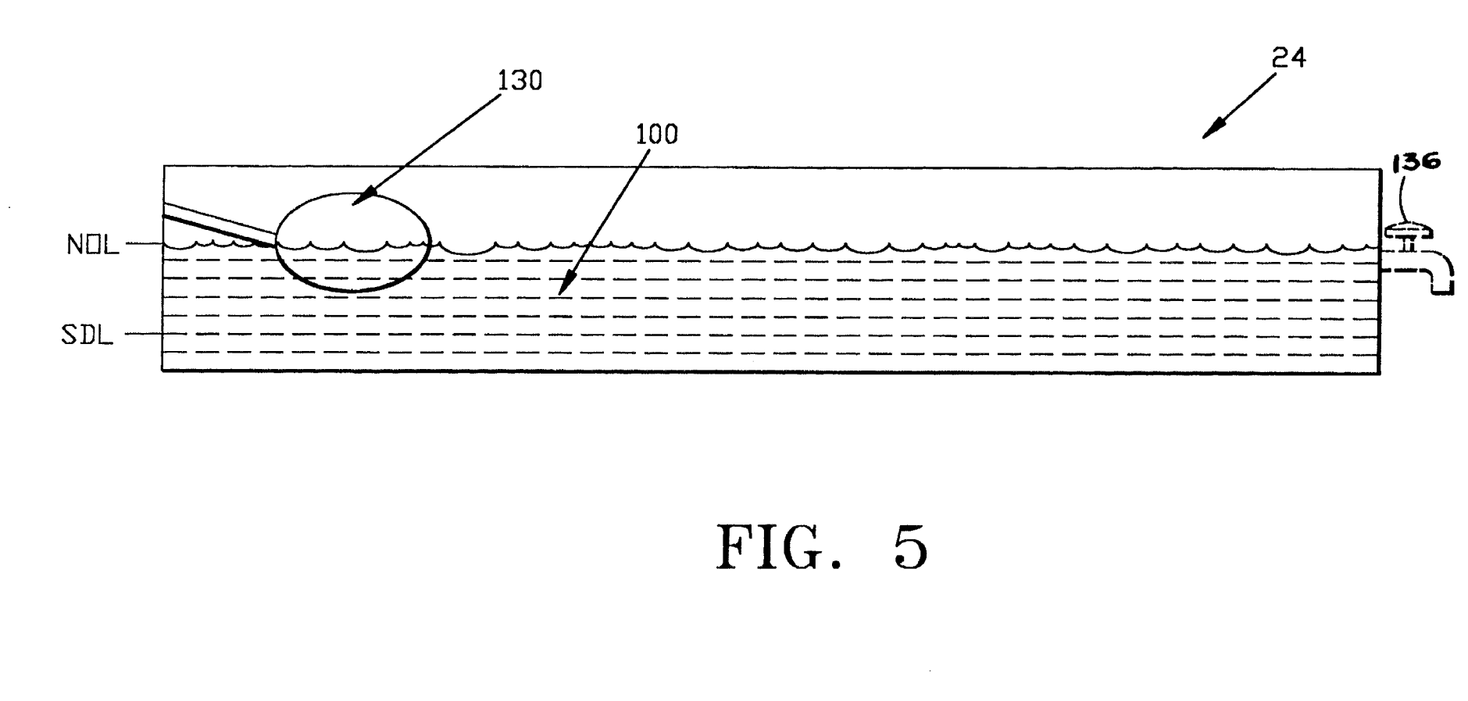
FIG. 5 is a sectional view taken along lines 5—5 of FIG. 4.

The interaction between the first and second pumps 22, 28 and the reservoir 24 is best described with reference to FIGS. 4 and 5.

The reservoir 24 contains a liquid level sensing device 130, for determining the level of wastewater WW within the reservoir 24. The liquid level sensor 130 is connected to a first switch (not shown) and a second switch (not shown) that are contained within the electronic control package 134 (FIG. 3) of the device 10. The first and second switches are provided for actuating various operations of the device 10 when the liquid level sensor 130 senses a normal operating level, NOL, and when the liquid level sensor 130 senses a shutdown level, SDL.

When the device 10 is in operation, the liquid level sensor 130 will try to maintain the level of wastewater within the reservoir 24 at the normal operating level, NOL. When the second pump 28 removes sufficient material from the reservoir 24 so that the level of wastewater sinks below the normal operating level, NOL, the first switch will cause the first pump 22 to begin drawing water from the wastewater barrel 16, and pumping it into the reservoir 24. When the liquid level sensing means 130 senses that the wastewater within the reservoir 24 has reached the normal operating level, the first switch will shut off the first pump 22, thus ending the intake of water into the reservoir 24 from the wastewater barrel 16. During this time, the second pump 28 continuously pumps water from the reservoir 24 into the wastewater applicator 20. A typical flow rate for the second pump 28 is about 0.3 gallons per minute.

The second switch is set to actuate when the liquid level sensor 130 senses that the water level has dropped to the shutdown level, SDL. Typically, the water level within the reservoir 24, and hence the liquid level sensor 130 will drop down to the shutdown level SDL when the source from which the wastewater is being drawn (e.g. barrel 16) is devoid of wastewater. The movement of the liquid level sensor 130 to the shut down level SDL will actuate the second switch, to cause the second switch to shut down the device, and cease operation of the various components of the device 10, including the heating means 38, the drive means and the exhaust means 54.

A spigot 136 is positioned on the side of the reservoir 24 at approximately the same level as the normal operating level NOL. The purpose of the spigot 136 is to permit the user to remove contaminants that may accumulate on the surface of the wastewater in the reservoir 24. Among the contaminants that may be found in wastewater are oil-based contaminants. When wastewater containing these oil-based contaminants are placed into the reservoir 24, certain oils will float on the top of the wastewater in the reservoir 24, forming a separate layer. This layer can then be drawn-off the top of the reservoir through the spigot 136. The placement of the spigot 136 at or near the normal operating level helps to ensure that the material removed by the spigot 136 is the oily contaminants, and not treatable wastewater.

Figure 6:
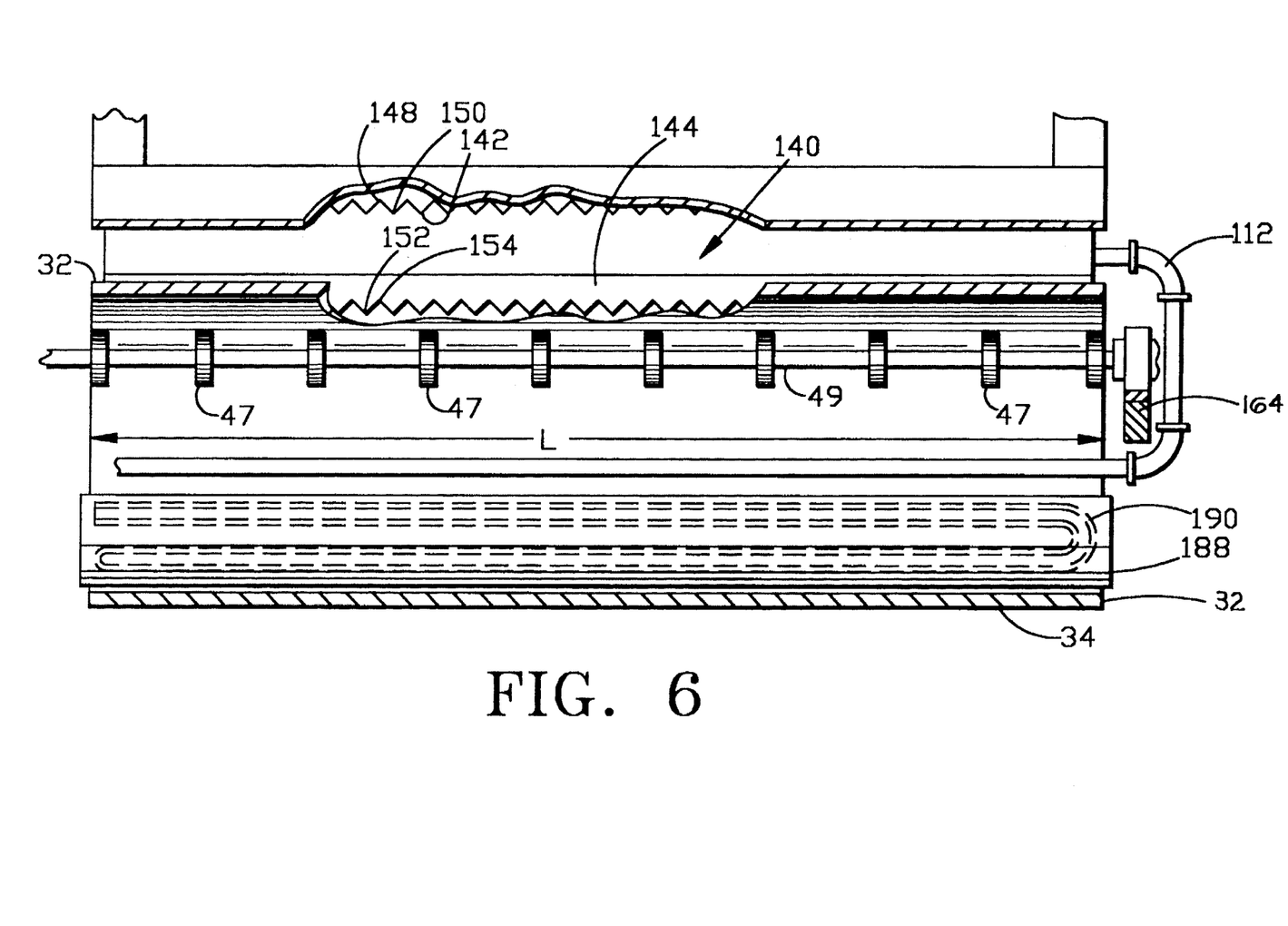
FIG. 6 is a sectional view taken along lines 6—6 of FIG. 4.

The water applicator means 20 is best shown in FIGS. 1, 6 and 4 as comprising a generally Y-shaped trough 140 that extends in a direction generally parallel to the longitudinal axis L of the drum 32, and extends generally the entire length of the drum 32. The trough 140 has first and second upwardly extending legs 142, 144, and a downwardly extending leg 146. The first upwardly extending leg 142 is generally shorter than the second upwardly extending leg 144. This difference in height is to ensure that when the wastewater within the interior of the trough 140 begins spilling over the sides of the trough, the wastewater will spill almost entirely over the first upwardly extending leg 142, rather than the second upwardly extending leg 144. Turning now to FIG. 6, it will be noted that at the upper edge of the first upwardly extending leg 142 has a serrated (saw toothed) upper edge having an alternating series of peak points 148, and nadir points 150. This saw toothed serrated edge provides for a more controlled flow of water over the top edge of the upwardly extending leg 142 of the trough 140, than would be accomplished with a generally planar upper edge. The lower edge of the downwardly extending leg 144 is also serrated, and contains a series of alternating peak points 152 and nadir points 154. Preferably, the respective peak points 148, 152 and respective nadir points 150, 154 of the upwardly extending leg 142 and downwardly extending leg 144 are aligned laterally. The applicant has found that the use of such a lateral alignment helps to ensure a more even application of wastewater to the radially outer evaporating surface 34 of the evaporator drum 32.

The evaporator drum is best shown in FIGS. 2–4 and 6 as comprising a generally cylindrical steel drum. In one embodiment of the present invention, the drum is approximately 30" (76.20 cm) in length, has diameter of about 12" (30.48 cm), and a thickness of about 0.25 inch (0.64 cm). The radially interior surface 36 of the drum 32 is preferably painted with a heat absorption enhancing material, such as black paint, to increase the retention of heat of the drum 32. However, the radially outer exterior evaporating surface 34 of the drum is left unpainted so as not to disturb the electromotive potential differences between the steel of the drum 32, and the various metals of the contaminant residue R.

As is best shown in FIGS. 1, 2, 4 and 6, the drum 32 is both supported and driven by a series of cylindrical elastomer disks 46, 47 that are a part of the drive means 44. The drive means 44 includes an electric motor 160 having an output shaft to which is journaled a sprocket 162.

The sprocket 162 of the motor 160 drives an endless chain 164. The endless chain 164 is also coupled to sprockets that are themselves fixedly coupled to the first drive shaft 48, and the second drive shaft 49. The first and second drive shafts 48, 49 extend generally parallel to the longitudinal axis L of the cylindrical drum, and are disposed in the interior of the drum 32. The first and second drive shafts 48, 49 are mounted to the frame by pillow blocks, 174, 176 respectively. The pillow blocks 174, 176 contain bearing surfaces that permit the first and second drive shafts 48, 49 to rotate freely within the pillow blocks 174, 176, while remaining fixedly mounted to the cross-member 72 of the frame 66. As such, both the pillow blocks 174, 176, and the drive shafts 48, 49 are supported by the cross-members 72 of the frame 66. Although not shown in the drawing, a pillow block is provided for supporting each of the two ends of each of the first and second drive shafts 48, 49. A series of high temperature elastomer disks 46, 47 are coupled to each of the first and second drive shafts 48, 49. Each of the disks 46, 47 has a radially inner surface that defines a hole that receives the respective shafts 48, 49, and a radially outer surface. The radially outer surface is provided for engaging the radially inner surface 36 of the drum 32. The rotation of the drive shafts 48, 49 rotates the elastomer disks 46, 47. Through their engagement with the radially inner surface 46 of the drum 32, the disks 46, 47 rotatably drive the drum in a direction indicated generally by arrow A (FIG. 1).

Turning now to FIG. 6, it will be noted that a plurality of cylindrical elastomer disks exists on each of the first and second drive shafts 48, 49. Preferably, the elastomer disks have an outer diameter of approximately 2 inches (5.08 cm), an inner diameter of approximately 0.625 inches (1.59 cm), and are spaced approximately two to three inches apart. In the embodiment shown in FIG. 6, a series of 10 elastomer disks 47 are shown as being used on the second drive shaft.

As best shown in FIG. 4, the first shaft 48 is positioned between and about 330° from the top center of the drum 32, and the second shaft is positioned about 30° from the top center of the drum. When so positioned, the elastomer disks 46, 47 and the drive shafts 48, 49 also serve to support the drum 32. Thus, the drum 32 rests upon the elastomer rings, 46, 47, and not a central axis.

The heater means 38 is best shown in FIGS. 4 and 6 as comprising a series of three radiant heaters, including a first radiant heater 180, a second radiant heater 182, and a third radiant heater 184. The radiant heaters 180, 182, 184 are disposed generally between about 100° and 260° from the top center of the drum. Each of the heaters extends generally parallel to the longitudinal and axis L of the drum 32, and extends generally throughout the entire length of the drum 32. As best shown in FIG. 6, each of the radiant heaters 180, 182, 184 includes a housing 188 and a coil 190. The housing 188 helps to direct the radiant energy generated by the coil 190 onto the radially inner surface 36 of the drum 32. The coil elements 190 are hair pin shaped electric heating elements similar to the heater elements one might use in a conveyer dryer, conveyer oven or the like. Because the coils 190 extend across the entire length of the drum 32, this radially inner surface 34 of the drum is generally uniformly heated. Additionally, by painting the radially inner surface 34 of the drum 32 black, the heat retention abilities of the drum 32 are enhanced.

The residue removal means includes a scraper blade 62 comprising a rigid, thin, rectangular plate having a sharpened edge capable of scraping residue from the exterior surface 36 of the drum 32. An upstanding bracket 134 is fixedly mounted to the blade 62 and is pivotally mounted to a cross-member 72 of the frame 70 by a pivot pin 196. A biasing means such as coil spring 198 is provided for biasing the scraping edge of the scraper blade 62 into engagement with the radially outer evaporating surface 34 of the drum 32. The blade 62 preferably extends generally along the entire length of the drum 32, and is approximately 30"

(76.20 cm) in length, and about 4" (10.16 cm) in width.

First and second residue removal chutes 202, 204 are disposed below the scraper blade 62 to catch residue that falls from the blade 62, and to transport the residue to the residue holding container 64 disposed below the residue removal chutes 202, 204. The residue removal chutes 202, 204 are angled downwardly to foster the flow of residue into the residue holding containers 64. The residue holding container 64 preferably comprises a stainless steel or PVC tray, that is approximately 30" (76.20 cm) in length, 9" (22.86 cm) in width, and 3" ( 5.08 cm) in height.

The exhaust means 54 includes a condensing means such as a V-shaped baffle plate 210 that is placed generally in the flow path of air drawn by the exhaust fan 222 of the exhaust means 54. The V-shaped baffle plate 210 has an exterior surface 214, and an interior surface 216, and is provided for fostering the condensation of droplets on its exterior surface 214. During the evaporation of wastewater from the evaporating surface 34 of the drum 32, droplets containing residue will often be "quick boiled" off of the surface of the drum 32. These droplets may contain a contaminant residue. The condensing means provided to help condense these "quick boiled" droplets before they are exhausted from the device 10. When so condensed, the droplets will tend to fall back onto the radially outer surface 34 of the drum 32, by virtue of the placement of the baffle plate 210 directly above the drum 32.

The V-shaped baffle plate 210 preferably extends generally along the entire length of the drum 32, and is sealingly engaged to a wall 220 of the frame 66 adjacent to which, or in which, the intake 224 of the exhaust fan 222 is placed. The opposite end of the V-shaped baffle (the end closest to the drive chain 1 (34) may be either sealingly engaged to a wall, or placed adjacent to a wall. The purpose of placement of the exhaust fan 220 and the V-shaped baffle 210 arrangement is to maximize the flow of air along the exterior surface 214 of the V-shaped baffle plate 210, to maximize the condensation of contaminant containing wastewater droplets on the exterior surface 214 of the baffle plate 210. By so doing, the contaminant content of the air exhausted from the device is minimized.

An exhaust duct 230 is disposed adjacent the outflow of the exhaust fan 224, for transporting the air either to a remote location, to a secondary treatment device or to the exterior of the building in which the device 10 is placed. Exhaust duct 230 can be configured from materials similar to a clothes dryer duct material.

The device 10 operates as follows. The intake hose 94 of the first pump 22 is first inserted into a wastewater feed stock source, such as barrel 16. The user then actuates the start button 82 to turn on the device 10. The electronic control package 134 places the device in its "start up mode" when the start button 82 is pushed. In its start up mode, the circuits within the electronic control package 34 are energized, but the only component that is actuated to begin work is the first pump 22. The first pump begins pumping water from the barrel 16 into the reservoir 24. During this time when water is being pumped into the reservoir 24, the second pump 28 is not actuated to pump any water from the reservoir 24 to the water applicator means 20, nor is the drum 32 being either heated by the heaters 180, 182, 184, or driven by the drive means. One way of accomplishing this start up mode is for the control package 134 to include a first or start-up relay.

The first pump 22 continues to fill the reservoir 24 with water, until the level sensor 130 reaches a predetermined level. Typically, this predetermined level is the normal operating level NOL. When the normal operating level NOL is reached, the first relay within the electronic control package 134 actuates the remaining components of the device 10 to begin the evaporation process. As such, the second pump 28 begins pumping water from the reservoir 24 to the water applicator trough 140, the electric motor 160 begins turning its output shaft to begin rotatably driving the drum 32, and the first, second and third heaters 180, 182, 184 are actuated to begin applying radiant heat energy to the radially inner surface 36 of the drum 32 to heat the drum 32. Additionally, the exhaust fan 222 begins exhausting evaporated water from the device 10.

As the water level within the reservoir 24 drops below the normal operating level, the liquid level sensor 130 causes the first switch to actuate the first pump 22 to begin pumping additional wastewater from the barrel 16 into the reservoir 24. As the normal operating level is achieved, the first switch shuts off the first pump 22. This intermittent operation of the first pump 22 continues, so long as the device 10 continues to operate, and the level of water within the reservoir 24 remains above the shut down level SDL. At any time, the operator may cease operation of the device 10 by turning the device off manually. Otherwise, the device 10 will continue to operate until the first pump 22 has pumped all of the available wastewater from the barrel 16. At such time, the liquid level sensor 130 will fall below the normal operator level, causing the first pump to be reactuated. However, as the first pump will have no wastewater to draw, the level of water within the reservoir 24 will continue to decrease, notwithstanding the actuation of the first pump 22. When the liquid level sensor 130 has reached the shut down level SDL, the second switch will signal the control package 134 to shut down the operation of the device 10. When so shut down, both pumps 22, 28, the heaters 180, 182, 184, the electric motor 160, and the exhaust fan 222, all cease operation. In such a condition, the device is in its "shut down" mode.

If the operator desires to treat additional wastewater, he can then remove the intake tube 94 of the first pump 22 from the spent wastewater barrel 16, and insert it into another barrel that contains a supply of wastewater. The user then restarts the machine, not by pushing the start/stop button 82, but rather by pushing the reset button 84. When the reset button 84 is pushed, a second relay within the control package 134 can be actuated to immediately actuate all of the components of the device 10. As such, the first pump 24 begins pumping water from the new barrel 16 into the reservoir 24, the second pump 28 begins pumping water from the reservoir 24 into the water applicator trough 140, the heaters 180, 182, 184 begin heating the barrel, and the motor 160 begins driving the barrel 32, and the exhaust fan 222 begins pulling evaporated water from the device 10. The device then continues to operate until it is either shut down manually, or automatically as described above.

The device also includes a means by which the user can adjust the operational characteristics of the device to maximize the evaporation of wastewater.

From a theoretical standpoint, it would appear beneficial to evaporate as much wastewater as possible, and to leave the residue as devoid of water as possible. However, in practice this is not necessarily the case. The applicants have found that if the residue is too "dry," the residue is prone to cream dust, which is undesirable. To reduce this dust, it is preferable that the residue be crystalline, but still retain enough moisture to prevent it from becoming too dusty.

Two main vehicles exist for controlling the moisture content of this residue. The first way for controlling the moisture residue is to control the flow rate of water that is applied to the drum 32. In the present invention, this is accomplished by adjusting the amount of water pumped by the second pump 28 to the water applicator trough 140. As discussed above, the volume of the second pump 28 can be varied by varying the radial position at which the rod 120 is coupled to the eccentric 118.

Another way for controlling the moisture content of the residue is to vary the residence time of the residue on the heated drum 32. As will be appreciated, the residence time of the wastewater, and the residue on the drum 32 will largely be a function of drum speed. At slower speeds, the wastewater and residue will tend to reside for a longer period of time on the evaporating radially outer surface 34 of the drum, and at faster rotational drum 32 speeds, the residue and wastewater will have a shorter residence time. As the dryness of the residue will increase with increasing residence time, it follows that a slower rotational speed of the dram 32 will tend to produce a dryer residue. In order to help the user adjust the speed of the dram 32 to achieve a proper moisture level in the residue, the user can adjust the dram rotational speed with the drum speed adjustment knob 86 that is placed on the control panel 80.

Although the invention has been described in detail with reference to the illustrated preferred embodiment, variations and modifications exist within the scope and spirit of the invention as described above, and as defined in the following claims.

What is claimed is:

1. A device for evaporating water from a contaminant containing wastewater, to produce a contaminate concentrated residue, the device comprising:

(1) a transport means for transporting wastewater to a wastewater applicator means, (2) a wastewater applicator means for applying wastewater to an evaporating surface of a rotatable evaporator drum means, (3) the rotatable evaporator drum means having a heat conductive evaporating surface, (4) a heater means for heating the evaporating surface to foster the evaporation of water from the wastewater, (5) a drive means for rotating the evaporator drum means, (6) a residue removal means for removing the contaminant concentrated residue from the evaporating surface, and (7) a control means for controlling the operation of the aforesaid device, components, wherein the wastewater applicator means is positioned adjacent to the evaporating surface, and comprises a trough having at least two upwardly extending legs and at least one downward extending leg, wherein at least one of the upwardly extending legs includes a serrated upper edge having an alternating series of peak points and nadir points, and the downwardly extending leg has a serrated lower edge having an alternating series of peak points and nadir points.

2. The device of claim 1 wherein the transport means includes:

(1) a first pump means for pumping wastewater from a wastewater storage means, and (2) a reservoir means for receiving wastewater pumped by the first pump means.

3. The device of claim 2 wherein the water reservoir means is positioned beneath the evaporator drum means for receiving wastewater that falls from the evaporator drum means for continuously concentrating the level of contaminants in the wastewater.

4. The device of claim 2 wherein the transport means includes a second pump means for pumping wastewater from the reservoir means to the wastewater applicator means and the reservoir means includes a liquid level sensing the level of wastewater in the reservoir means.

5. The device of claim 4 wherein the control means includes a first switch means operatively coupled between the liquid level sensing means and the first pump means for turning the first pump means on and off in response to the level of liquid in the reservoir means to maintain the wastewater in the reservoir means generally at a first predetermined level.

6. The device of claim 4 wherein the control means includes a first switch means operatively coupled between the liquid level sensing means and the first pump means for turning the first pump means on and off in response to the level of liquid in the reservoir means to maintain the wastewater in the reservoir means at a first predetermined level, and a second switch means operatively coupled between the liquid level sensing means and the control means for turning off a plurality of the aforesaid device components in response to the level of liquid in the reservoir means dropping below a second predetermined level.

7. The device of claim 1 wherein the trough is generally Y-shaped and extends generally along the length of the evaporating surface of the evaporator drum means, the nadir points of the serrated upper edge of one of the upwardly extending legs is placed at a level lower than an upper edge of other of the at least two upwardly extending legs, and the peak points of the serrated upper edge of the one upwardly extending legs are laterally aligned with the peak points of the serrated lower edges of the downwardly extending leg.

8. The device of claim 1 wherein the evaporator drum means is generally cylindrical, has a longitudinal axis, is comprised of a heat conductive material, and has a radially outer surface and radially inner surface, the radially outer surface comprising the heat conductive evaporating surface.

9. The device of claim 8 wherein the drive means comprises a motor means and a shaft means driven by the motor means, the shaft means being engageable with the radially inner surface of the evaporator drum means for supporting and rotatably driving the evaporator drum means.

10. The device of claim 9 wherein the shaft means includes a rotatable first drive shaft extending generally parallel to the longitudinal axis of the evaporator drum means, and a rotatable second drive shaft extending generally parallel to the longitudinal axis of the evaporator drum means, each of the first and second shafts including at least one disk having a radially outer surface for engaging for radially inner surface of the evaporator drum means.

11. The device of claim 10, wherein the disks together comprise at least two cylindrical disks, each of said cylindrical disks including a radially inner surface for engaging one of the first and second drive shafts, the first drive shaft being positioned between about 350° and 350° from the top center of the evaporator drum means, and the second drive shaft being positioned between about 10° and 45° from the top center of the evaporator drum means, wherein the engagement between the radially outer surface of the engaging disks and the radially inner surface of the evaporator drum means both rotatably drives the evaporator drum means about its longitudinal axis, and supports the evaporator drum means.

12. The device of claim 11 wherein each of the first and second drive shafts includes a sprocket means, and the drive means includes a chain means for coupling the motor means and the first and second drive shafts.

13. The device of claim 8 wherein the heater means extends generally parallel to the longitudinal axis of the evaporator drum means, and is disposed adjacent to the radially inner surface of the evaporator drum means.

14. The device of claim 13 wherein the heater means comprises a radiant heater means that is disposed between about 100° and 260° from the top center of the evaporator drum means.

15. The device of claim 1 wherein the residue removal means comprises a scraper means engageable with the evaporating surface of the evaporator drum means for scraping contaminant concentrated residue from the evaporator drum means.

16. The device of claim 15 wherein the residue removal means includes a residue holding means for holding residue removed by the scraper means, and a chute means for conducting residue from the scraper means to the residue holding means.

17. The device of claim 15 wherein the device includes a frame, the scraper means is pivotally mounted to the frame, and a biasing means is provided for biasing the scraper means into engagement with the evaporating surface of the evaporator drum means.

18. The device of claim 1 further comprising an exhaust means for exhausting evaporated water from the device, the exhaust means including a condensing means for condensing wastewater droplets thereon.

19. The device of claim 18, wherein the exhaust means includes an exhaust fan, having an intake, and the condensing means comprises a generally V-shaped condensing plate that extends in a direction generally parallel to the longitudinal axis of the evaporator drum means, and is disposed generally above and adjacent to the evaporating surface of the evaporator drum means to foster a flow of condensate from the condensing means on to the evaporating surface of the evaporator drum means.

20. The device of claim 19 wherein the condensing plate has an exterior surface, an interior surface, a first end and a second end, the device includes a frame having a wall, the exhaust means comprises an exhaust fan disposed adjacent the wall, and the first end of the condensing plate is disposed adjacent to the wall, to promote a flow of air drawn by the exhaust fan air along the exterior surface of the condensing plate.

21. The device of claim 1 wherein the control means includes a start mode controller means for controlling the operation of the aforesaid device components in a start up mode, a reset mode controller means for controlling the operation of the aforesaid device components in a reset mode, and a shut down mode controller means for controlling the operation of the aforesaid device components in a shut down mode performed in response to a perceived lack of wastewater in the reservoir means.

22. The device of claim 21 wherein said transport means includes
  (1) a first pump means for pumping wastewater from a wastewater storage means,
  (2) a reservoir means for receiving wastewater pumped by the first pump means,
  (3) a second pump means for pumping wastewater from the reservoir means to the wastewater applicator means, and
  (4) a liquid level sensing means for sensing the level of the wastewater in the reservoir means, and
said start mode controller means includes means for actuating the first pump means only in response to actuation of the start mode controller means, first switch means operatively coupled between the liquid level sensing means and the start mode controller means for actuating the heater means, second pump means, and drive means in response to the level of liquid in the reservoir means achieving a predetermined level.

23. The device of claim 22 wherein the reset mode controller means includes means for actuating the first pump means, the heater means, the second pump means and the drive means in response to actuation of the reset mode controller means.

24. A device for evaporating water from a contaminant containing wastewater, to produce a contaminate concentrated residue, the device comprising:
  (1) a transport means for transporting wastewater to a wastewater applicator means, the transport means including a first pump means for pumping wastewater from a wastewater storage means, a reservoir means for receiving wastewater pumped by the first pump means, a second pump means for pumping wastewater from the reservoir means to a wastewater applicator means, the reservoir means including a spigot means positioned at about a first predetermined level for drawing off contaminants floating on the surface of the wastewater in the reservoir means, and a liquid level sensing means for sensing the level of the wastewater in the reservoir means.
  (2) a wastewater applicator means for applying water to an evaporating surface of a rotatable evaporator drum means,
  (3) the rotatable evaporator drum means having a heat conductive evaporating surface,
  (4) a heater means for heating the evaporating surface to foster the evaporation of water from the wastewater,
  (5) a drive means for rotating the evaporator drum means,
  (6) a residue removal means for removing the contaminant concentrated residue from the evaporating surface, and
  (7) a control means for controlling the operation of the aforesaid device components, the control means including a first switch means operatively coupled between the liquid level sensing means and the first pump means for turning the first pump means on and off in response to the level of liquid in the reservoir means to maintain the wastewater in the reservoir means generally at the first predetermined level.

25. A device for evaporating water from a contaminant containing wastewater to produce a contaminant concentrated residue, the device comprising:
  (1) a transport means for transporting wastewater to a wastewater applicator means, the transport means including:
    (a) a first pump means for pumping wastewater from a wastewater storage means,
    (b) a reservoir means for receiving wastewater pumped by the first pump means, the reservoir means including a liquid level sensing means for sensing the level of waste water in the reservoir means, and
    (c) a second pump means for pumping wastewater from the reservoir means,
  (2) a wastewater applicator means for receiving wastewater from the second pump means, and for applying the wastewater to an evaporating surface of a generally cylindrical, rotatable heat conductive evaporator drum means, the wastewater applicator means comprising a trough having at least two upwardly extending legs and at least one downwardly extending leg, at least one of the upwardly extending legs including a serrated edge over which wastewater can pass, (3) the evaporator drum means having a longitudinal axis, a radially inner surface, and a radially outer surface, the radially outer surface comprising a heat conductive evaporating surface, (4) a heater means for heating the evaporating surface to foster the evaporation of water from the wastewater, the heater means extending generally parallel to the longitudinal axis of the evaporator drum means, and being disposed adjacent to the radially inner surface of the evaporator drum means, (5) a drive means for rotating and supporting the evaporator drum means, the drive means including:
  (a) a motor means,
  (b) at least one rotatable shaft means extending generally parallel to the longitudinal axis of the evaporator drum means, and including at least one disk means having a radially outer surface for engaging the radially inner surface of the evaporator drum means for supporting the evaporator drum means and rotating the evaporator drum means about its longitudinal axis, (6) a residue removable means including a scraper means engageable with the evaporating surface of the evaporator drum means for scraping contaminant concentrated residue from the drum means, and a biasing means for biasing the scraper means into engagement with the evaporating surface of the evaporator drum means, (7) an exhaust means for exhausting evaporated water from the device, the exhaust means including a condensing means for condensing wastewater droplets thereon, and (8) control means for controlling the operation of the aforesaid device components.

* * * * *